(12) United States Patent
Lee et al.

(10) Patent No.: US 7,739,358 B2
(45) Date of Patent: Jun. 15, 2010

(54) SYSTEMS AND METHODS FOR RECOMMENDING WEBSITE HOSTING APPLICATIONS

(75) Inventors: Yong Lee, Chandler, AZ (US); Jason Chappie, Gilbert, AZ (US); Justin Jilg, Mesa, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 289 days.

(21) Appl. No.: 12/029,062

(22) Filed: Feb. 11, 2008

(65) Prior Publication Data

US 2008/0147856 A1 Jun. 19, 2008

(51) Int. Cl.
*G06F 15/26* (2006.01)

(52) U.S. Cl. .................. 709/219; 709/203; 709/217; 709/218

(58) Field of Classification Search ................. 709/207, 709/203, 217, 219, 218; 705/27, 10; 455/406; 715/700; 719/328
See application file for complete search history.

(56) References Cited

U.S. PATENT DOCUMENTS

| 6,654,804 | B1 | 11/2003 | Fleming |
| 6,789,103 | B1 | 9/2004 | Kim et al. |
| 6,842,769 | B1 | 1/2005 | Kim et al. |
| 6,868,444 | B1 | 3/2005 | Kim et al. |
| 2002/0019763 | A1* | 2/2002 | Linden et al. ............... 705/10 |
| 2006/0047965 | A1 | 3/2006 | Thayer et al. |
| 2008/0040239 | A1* | 2/2008 | Jacobi et al. ............... 705/27 |
| 2008/0040733 | A1* | 2/2008 | Pousti et al. ............... 719/328 |
| 2008/0250312 | A1* | 10/2008 | Curtis ....................... 715/700 |
| 2008/0270561 | A1* | 10/2008 | Tang et al. ................ 709/207 |
| 2008/0287095 | A1* | 11/2008 | Pousti ....................... 455/406 |

OTHER PUBLICATIONS

Unpublished U.S. Appl. No. 12/136,677, filed Oct. 2, 2008.
Unpublished U.S. Appl. No. 11/708,737, filed Aug. 21, 2008.
Unpublished U.S. Appl. No. 11/708,736, filed Aug. 21, 2008.
Unpublished U.S. Appl. No. 11/708,729, filed Aug. 21, 2008.
Unpublished U.S. Appl. No. 11/708,976, filed Aug. 21, 2008.
Unpublished U.S. Appl. No. 12/136,659, filed Oct. 2, 2008.
Braden, RFC 1123, Requirements for Internet Hosts—Application and Support, Oct. 1989.

* cited by examiner

*Primary Examiner*—Le Luu
(74) *Attorney, Agent, or Firm*—Karl A. Fazio (57) ABSTRACT

Systems and methods of the present invention allow for recommending hosting applications. An exemplary method may comprise the steps of receiving a URL for a Submitted Website from a potential customer, determining the features of the Submitted Website, and offering Hosting Applications (that implement the Submitted Website's features) for sale to said potential customer.

17 Claims, 6 Drawing Sheets

SYSTEMS AND METHODS FOR RECOMMENDING WEBSITE HOSTING APPLICATIONS

FIELD OF THE INVENTION

The present inventions generally relate to the field of Internet website hosting and, more specifically, systems and methods for recommending website hosting applications.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites offering and selling goods and services to individuals and organizations (i.e., potential customers). Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Websites may have different features that can be implemented by various Hosting Applications (i.e., server-side software generating the requisite functionality). Examples include a website's operating system, e-mail, online file storage (e.g., documents, videos, photos, etc.), forums, blogs, shopping cart, SSL certificates, flash, etc. Hosting providers may offer to sell such Hosting Applications to potential customers.

Applicant, however, has noticed that presently-existing systems and methods do not provide potential customers with an adequate set of tools to determine which Hosting Applications they may want to purchase and implement on their website. Specifically, they do not allow potential customers to model their website after the features implemented by another example website. For the foregoing reasons, there is a need for the systems and methods for recommending Hosting Applications and related functionality as described herein.

SUMMARY OF THE INVENTION

The limitations cited above and others are substantially overcome through the systems and methods disclosed herein, which allow for recommending website hosting applications.

In an example embodiment of a system for recommending hosting applications, a Search Webpage may be hosted on at least one server communicatively coupled to a Network. The Search Webpage may have a data field for entry of a URL for a Submitted Website. A Recommendation Engine may be communicatively coupled to the Network, and may comprise computer-readable media with instructions executable by a processor, which perform the steps of: i) analyzing the Submitted Website; ii) generating a Website Profile comprising a list of features of the Submitted Website; and iii) generating a list of Hosting Applications that match the features listed in the Website Profile. The system also may comprise a Shopping Cart on the Search Webpage that may be populated with the Hosting Applications for sale to a potential customer.

An exemplary method for recommending hosting applications may comprise the steps of receiving a URL for a Submitted Website from a potential customer, determining the features of the Submitted Website, and offering Hosting Applications (that implement the features) for sale to said potential customer.

The above features and advantages of the present invention will be better understood from the following detailed description taken in conjunction with the accompanying drawings.

DETAILED DESCRIPTION

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 1:
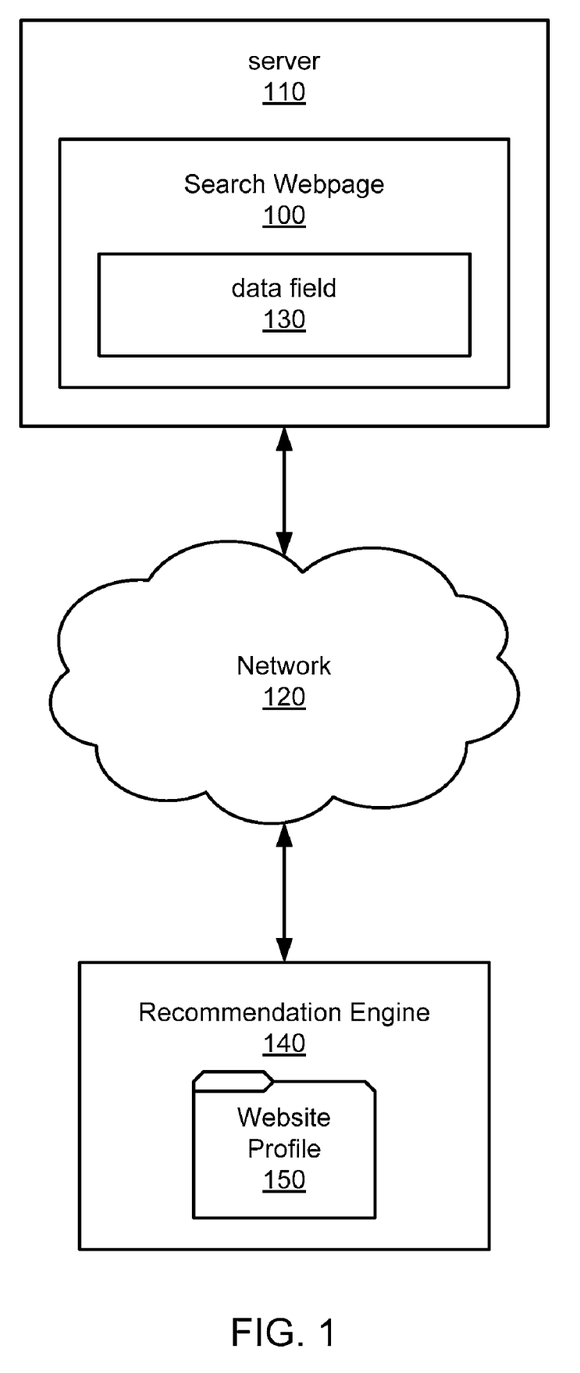
FIG. 1 illustrates a possible embodiment of a system for recommending hosting applications.

A streamlined example embodiment of a system for recommending Hosting Applications is illustrated in FIG. 1. The illustrated embodiment includes a Search Webpage 100 hosted on at least one server 110 communicatively coupled to a Network 120. The Search Webpage 100 may have a data field 130 for entry of a URL for a Submitted Website. A Recommendation Engine 140 also may be communicatively coupled to the Network 120, and may comprise computer-readable media with instructions executable by a processor, which perform the steps of: i) analyzing the Submitted Website; ii) generating a Website Profile 150 comprising a list of features of the Submitted Website; and iii) generating a list of Hosting Applications that match the features listed in the Website Profile 150.

The example embodiments herein place no limitation on Network 120 configuration or connectivity. Thus, as non-limiting examples, the Network 120 could comprise the Internet, an intranet, an extranet, a local area network, a wide area network, a wired network, a wireless network, a telephone network, or any combination thereof.

The Search Webpage 100, which may be a webpage on a hosting provider's website, is a place on the Internet where potential customers may go to identify the features of a Submitted Website and purchase Hosting Applications that perform the same features. The Search Webpage 100 may be accessed by a potential customer (or any Network 120 user) by entering the webpage's URL into a browser, which will cause the Search Webpage 100 to resolve from the domain name.

The Search Webpage 100 may be hosted on at least one server 110 by, as a non-limiting example, subscribing to a hosting provider (e.g., GODADDY.COM) for website hosting services (e.g., GODADDY.COM's HOSTING PLANS). Alternatively, the at least one server 110 could be any computer or program that provides services to other computers, programs, or users either in the same computer or over a computer network. As non-limiting examples, the at least one server 110 could be an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

The Search Webpage 100 may be communicatively coupled to a Network 120 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (Ti, Frame Relay), Point-to-Point Protocol over Ethernet (PPPoE), and/or any combination thereof.

The Recommendation Engine 140 also may be communicatively coupled to the Network 120 (perhaps using the methods described above) and comprises software-implemented logic (i.e., computer-readable media with instructions executable by a processor) that performs the analysis of the Submitted Website, determines its features, and recommends Hosting Applications for purchase. This is accomplished by analyzing the Submitted Website, generating a Website Profile 150 comprising a list of features of the Submitted Website (e.g., functionality, operating system, software-implemented tools, etc.) and generating a list of Hosting Applications that match the features listed in the Website Profile 150. The software-implemented logic may reside on any computer or server having a processor that is communicatively coupled to the Network or, alternatively, may reside on the at least one server 110 hosting the Search Webpage 100.

Figure 2:
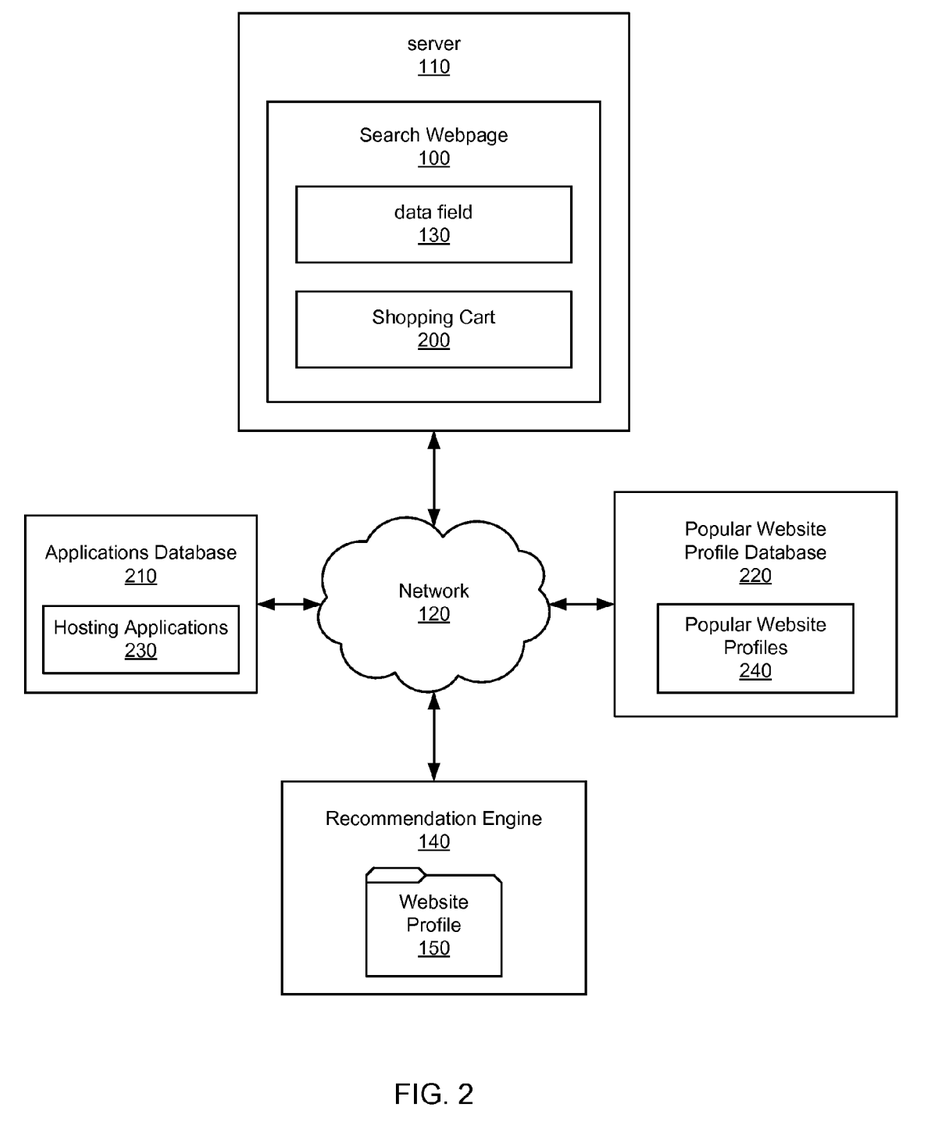
FIG. 2 illustrates a possible embodiment of a system for recommending hosting applications.

In an alternate embodiment of a system for recommending Hosting Applications, illustrated in FIG. 2, the Search Webpage 100 also may comprise a Shopping Cart 200. As a non-limiting example, the Shopping Cart 200 may be implemented via shopping cart software (i.e., software used in e-commerce to assist online purchases), such as GODADDY-.COM's QUICK SHOPPING CART. Such software may be installed on the server 110, or on another secure server that may accept sensitive ordering information. In this example embodiment, the Recommendation Engine 140 also may cause the processor to populate the Shopping Cart 200 with the Hosting Applications 230 that match the features listed in the Website Profile 150. This allows potential customers to view, and perhaps purchase, Hosting Applications that will allow them to implement the features of the Submitted Website on their own website.

This embodiment also may comprise an Applications Database 210 communicatively coupled to the Network 120 and searchable by the Recommendation Engine 140. The Applications Database 210 may comprise a list of Hosting Applications 230 that may be offered to a potential customer. The Hosting Applications 230 listed in the Applications Database 210 may comprise any piece of software relevant to hosting and/or operating a website including, but not limited to, operating system, e-mail, online file storage (e.g., documents, videos, photos, etc.), forums, blogs, shopping cart, SSL certificates, flash, etc. Structurally, the Applications Database 210 may comprise any collection of data. As non-limiting examples, the Applications Database 210 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage located on the server 110, a computer, a client, another server, or any other storage device.

This embodiment also may comprise a Popular Website Profile Database 220 communicatively coupled to the Network 120 and searchable by the Recommendation Engine 140. The Popular Website Profile Database 220 may comprise a plurality of Popular Website Profiles 240 for popular websites. The popular websites may comprise any well-known and/or frequently accessed website, such as www.godaddy.com, www.google.com, www.yahoo.com, www.wikipedia.com, or www.youtube.com. The Popular Website Profiles 240 may comprise a list of features of popular websites (e.g., functionality, operating system, software-implemented tools, etc.). The Popular Website Profiles 240 may be manually generated (i.e., by analyzing popular websites, identifying their features, and manually preparing a Popular Website Profile 240 for each popular website). Alternatively, automated processes, such as analytical software, may perform the analysis and generate the profiles. Structurally, any database type described above may be used.

Figure 3:
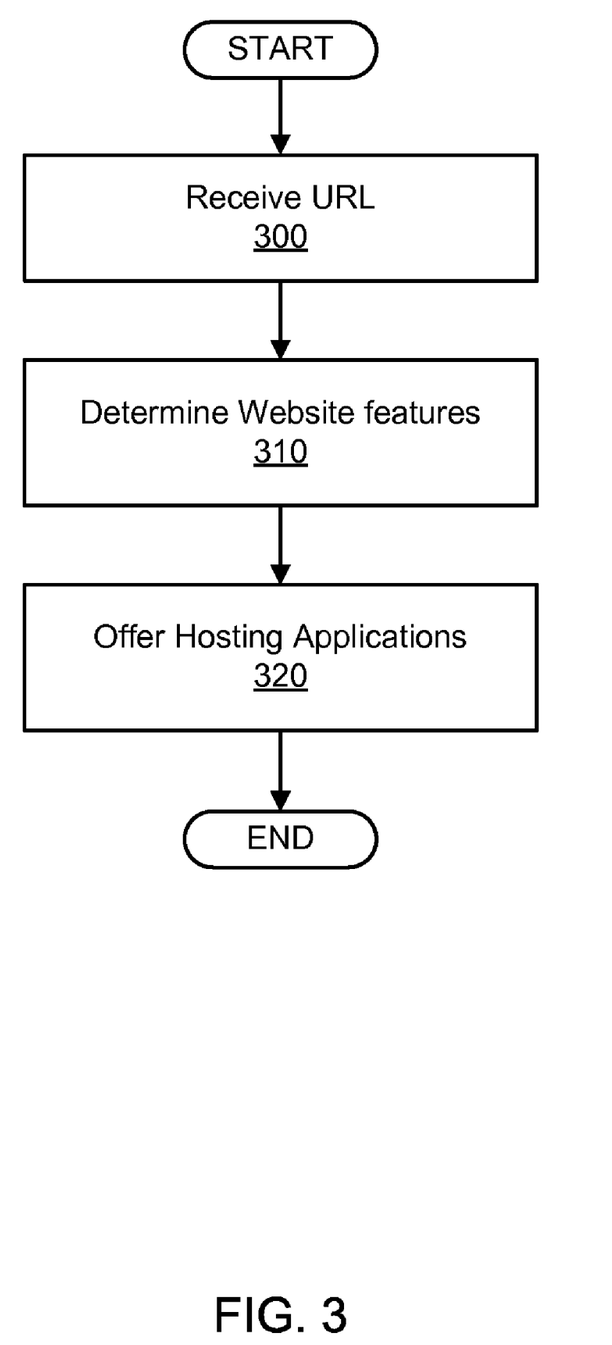
FIG. 3 is a flow diagram illustrating a possible embodiment of a method for recommending hosting applications.

Several different methods may be used to recommend hosting applications. In the streamlined example embodiment illustrated in FIG. 3, a URL for a Submitted Website is received from a potential customer (Step 300). At least one feature of the Submitted Website is then determined (Step 310). Finally, at least one Hosting Application (that implements the Submitted Website's features) is offered for sale to the potential customer (Step 320).

Figure 4:
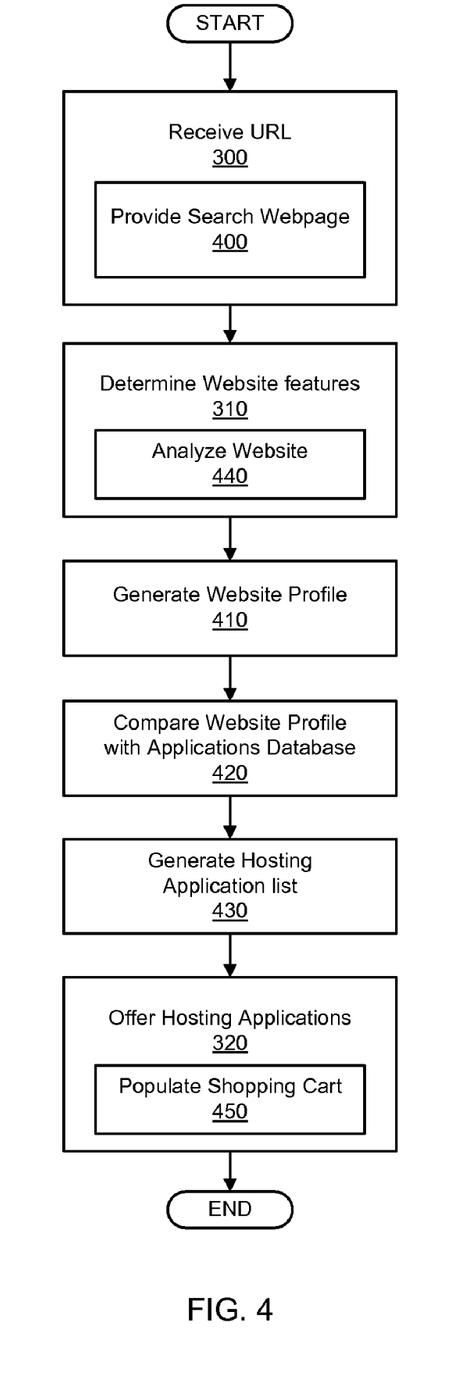
FIG. 4 is a flow diagram illustrating a possible embodiment of a method for recommending hosting applications.

A more detailed embodiment of a method for recommending hosting applications is illustrated in FIG. 4. In this example embodiment, the URL for a Submitted Website may be received from a potential customer (Step 300) by providing a Search Webpage 100 (Step 400) having a data field 130 for entry of the URL. This embodiment places no limitation on the individual or entity providing the Search Webpage 100. Thus, among others, this method may be performed by an individual, entity, automated system, domain name registrar, domain name registry, reseller of a domain name registrar, Internet service provider, software developer, website designer, website operator, or any combination thereof. The Search Webpage 100 may be provided by hosting it on at least one server 110 by, as a non-limiting example, subscribing to a hosting provider (e.g., GODADDY.COM) for website hosting services (e.g., GODADDY.COM's HOSTING PLANS). Alternatively, the Search Webpage 100 may be hosted on any computer or program that provides services to other computers, programs, or users either in the same computer or over a computer network including, but not limited to, application, communication, mail, database, proxy, fax, file, media, web, peer-to-peer, or standalone servers.

The Submitted Website resolving from the submitted URL may then be analyzed (Step 440) (perhaps by analyzing a HTTP reply received from said Submitted Website) to determine the Submitted Website's features that the potential customer may wish to utilize on his own website (Step 310). Alternatively, software that scans the Submitted Website for functionality may be used. Using the information gleaned during this analysis (Step 440), a Website Profile 150 comprising a list of the Submitted Website's features may be generated (Step 410). For example, if the Submitted Website used the WINDOWS SERVER 2003 operating system, included blog functionality, and had a shopping cart, the Website Profile 150 may contain a list of these features.

The Website Profile 150 may then be compared against an Applications Database 210 having a list of Hosting Applications 230 that may be offered for sale to potential customers (Step 420). This step may be accomplished by the Recommendation Engine 140 described above, or by any other method known in the art or developed in the future for searching a database. A list of the Hosting Applications 230 that match at least one of the features listed in the Website Profile 150 may then be generated (Step 430) and offered for sale to the potential customer (Step 320), perhaps by populating a Shopping Cart 200 with the Hosting Applications 230 for sale (Step 450).

Figure 5:
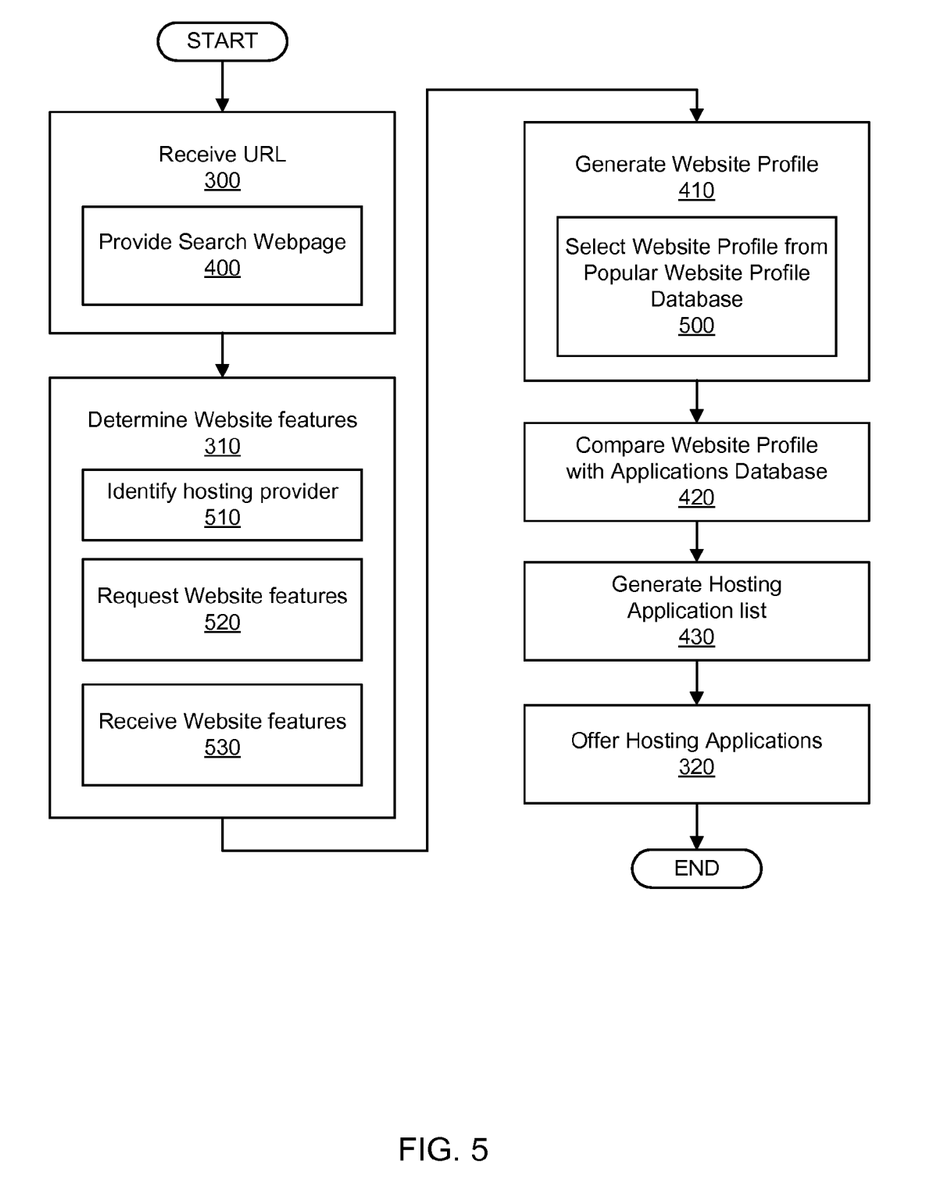
FIG. 5 is a flow diagram illustrating a possible embodiment of a method for recommending hosting applications.

In the embodiment of a method for recommending hosting applications illustrated in FIG. 5, the step of determining the Submitted Website's features (Step 310) may be accomplished by identifying a hosting provider hosting the Submitted Website (Step 510) and subsequently requesting (Step 520) and receiving (Step 530) a list of features from the hosting provider. The hosting provider may be determined (Step 510) by analyzing a HTTP reply received from said Submitted Website. Alternatively, a WHOIS lookup of the Submitted Website's domain name may be performed. WHOIS records may be maintained by a domain name registry or registrar and are readily accessible over the Internet. WHOIS is a TCP-based query/response protocol that is widely used for querying these records to determine the owner of a domain name, an IP address, or an autonomous system number on the Internet. The WHOIS search may utilize either a command line interface or a web-based tool and either "thick" or "thin" lookups. "Thin" registries store a limited amount of information about a domain name, typically including: "Domain Name," "Registrar," "Whois Server," "Referral URL," "Name Server," "Status," "Updated Date," "Creation Date," "Expiration Date," etc. "Thick" registries also store Registrant, Administrative, Technical, and Billing contact information. The .info and .biz TLDs are "thick" while .com and .net TLDs are "thin." Registrars usually store detailed information about the domain names registered through them.

A list of Submitted Website features may then be requested and received from the hosting provider (Steps 520-530). This may be accomplished via any automated or manual method of communicating with a hosting provider known in the art or developed in the future including, but not limited to HyperText Transfer Protocol (HTTP), File Transfer Protocol (FTP), e-mail, instant messaging, telephone call, and/or facsimile.

In this example embodiment, a Website Profile 150 may then be generated (Step 410), perhaps by selecting a Popular Website Profile 240 from a Popular Website Profile Database 220 (Step 500). As set forth in detail above, The Popular Website Profile Database 220 may comprise a plurality of Popular Website Profiles 240 for popular websites. The selected Popular Website Profile 240 may list features similar to those of the Submitted Website. As set forth in detail above, the Website Profile 150 may then be compared against an Applications Database 210 (Step 420) and a list of the Hosting Applications 230 may be generated (Step 430) and offered for sale to the potential customer (Step 320), perhaps by populating a Shopping Cart 200 with the Hosting Applications 230 for sale (Step 450).

Figure 6:
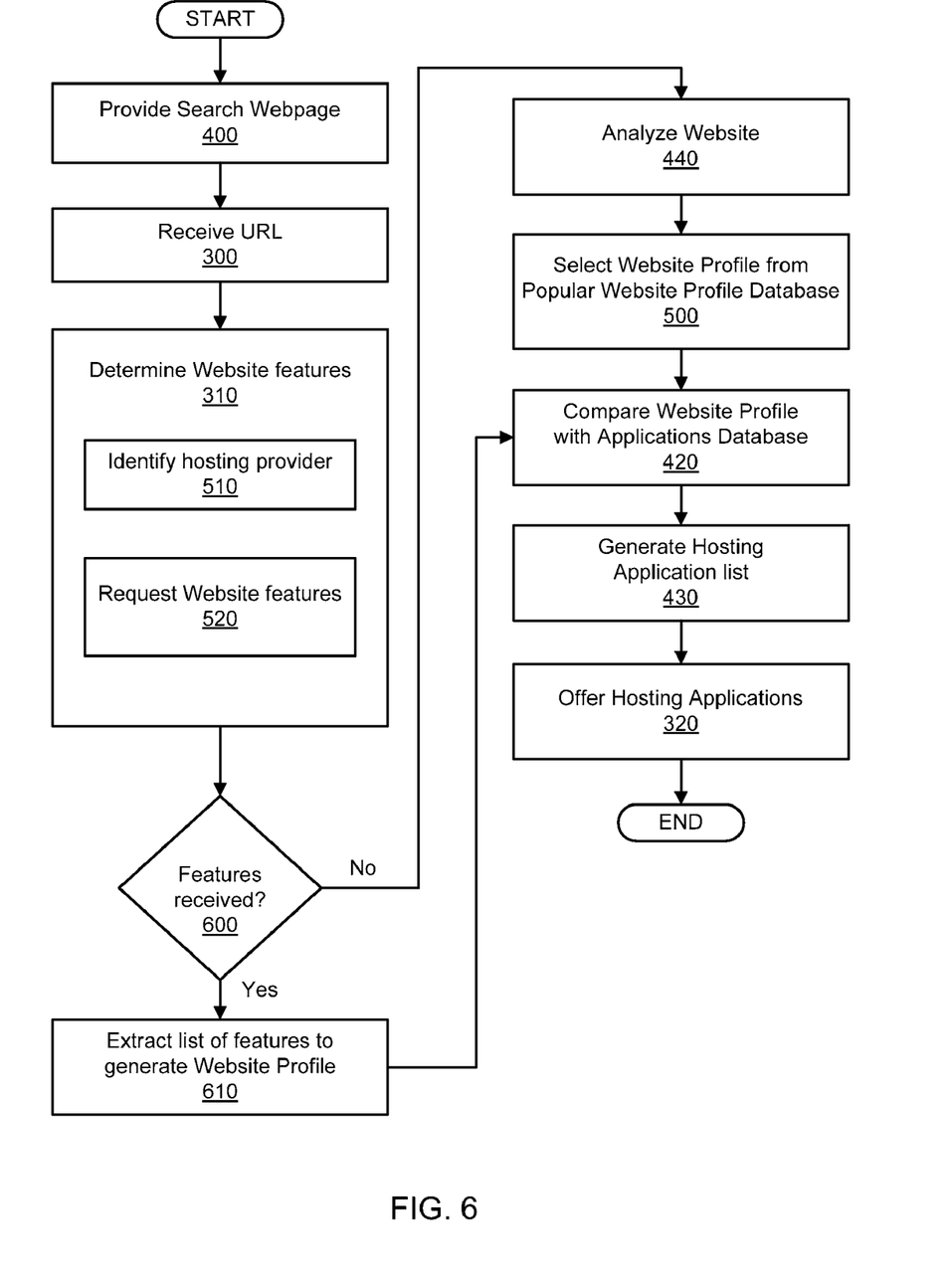
FIG. 6 is a flow diagram illustrating a possible embodiment of a method for recommending hosting applications.

In the embodiment of a method for recommending hosting applications illustrated in FIG. 6, a URL for a Submitted Website may be received from a potential customer (Step 300) by providing a Search Webpage 100 (Step 400) having a data field 130 for entry of the URL. The Submitted Website's features may then be determined (Step 310), perhaps by identifying a hosting provider hosting the Submitted Website (Step 510) and subsequently requesting (Step 520) and a list of features from the hosting provider.

If the list of features is received (Step 500), a Website Profile 150 may be generated by extracting a list of features from the information received from the hosting provider (Step 610). If the list of features is not received, the Submitted Website may be analyzed (Step 440)—perhaps by analyzing a HTTP reply received from said Submitted Website—to determine the Submitted Website's features that the potential customer may wish to utilize on his own website. Alternatively, software that scans the Submitted Website for functionality may be used. Using the information gleaned during this analysis (Step 440), a Website Profile 150 may then selected from a Popular Website Profile Database 220 (Step 500).

Once the Website Profile 150 is generated, it then may be compared against an Applications Database 210 (Step 420) and a list of the Hosting Applications 230 may be generated (Step 430) and offered for sale to the potential customer (Step 320), perhaps by populating a Shopping Cart 200 with the Hosting Applications 230 for sale (Step 450).

In another example embodiment, a potential customer may decide to register a domain name and develop a website to be associated with the domain name. To determine which features he may want to implement on his website, the potential customer may research other websites on the Internet. Once he identifies a website with the requisite features (e.g., operating system, e-mail, online file storage for documents, videos, photos, etc., forums, blogs, shopping cart, SSL certificates, flash, etc.), he may go to a Search Webpage 110, perhaps on a hosting provider's website. The Search Webpage 110 may allow the potential customer to enter the URL of a website (the Submitted Website) in a data field 130.

A Recommendation Engine 140 may then determine the Submitted Website's features (Step 310) and generate a Website Profile 150 for the Submitted Website (Step 410). As set forth in detail above, this may be accomplished by analyzing the Submitted Website (Step 440), requesting a list of features from the Submitted Website's hosting provider (Steps 510, 520, and 530), and/or selecting an appropriately-matching Popular Website Profile 240 from a Popular Website Profile Database 220. The Recommendation Engine 140 may then compare the Website Profile 150 against an Applications Database 210 (Step 420) and generate a list of Hosting Applications 230 (Step 430) that may allow the potential customer's website to perform the functionality of the Submitted Website. These Hosting Applications 230 then may be offered for sale to the potential customer (Step 320), perhaps by populating a Shopping Cart 200 on the Search Webpage 100, or elsewhere on the hosting provider's website.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system for recommending hosting applications, comprising:
   a) a Search Webpage hosted on at least one server communicatively coupled to a Network, said Search Webpage having a data field for entry of a URL for a Submitted Website; and
   b) a Recommendation Engine communicatively coupled to said Network, said Recommendation Engine comprising a computer-readable media with instructions executable by a processor, which when executed by said processor, causes said processor to perform the steps of:
      i) analyzing said Submitted Website;
      ii) determining an operating system on which said Submitted Website is running;
      iii) determining at least one software-implemented tool provided via said Submitted Website;
      iv) generating a Website Profile identifying said operating system and said at least one software-implemented tool; and
      v) generating a list of at least one Hosting Application matching said operating system and said at least one software-implemented tool identified in said Website Profile.

2. The system of claim 1, further comprising a Shopping Cart on said Search Webpage.

3. The system of claim 2, wherein said Recommendation Engine further causes said processor to perform the step of populating said Shopping Cart with said list of at least one Hosting Application.

4. The system of claim 1, further comprising an Applications Database comprising a list of Hosting Applications that may be offered to a potential customer, said Applications Database communicatively coupled to said Network and searchable by said Recommendation Engine.

5. The system of claim 4, further comprising a Popular Website Profile Database comprising a plurality of Popular Website Profiles for popular websites, said Popular Website Profile Database communicatively coupled to said Network and searchable by said Recommendation Engine.

6. The system of claim 1, wherein said at least one software-implemented tool comprises an e-mail application, an online file storage application, a forum application, a blog application, a shopping cart application, an SSL certificate, or a flash-based application.

7. A system for recommending hosting applications, comprising:
   a) a Search Webpage hosted on at least one server communicatively coupled to a Network, said Search Webpage having a data field for entry of a URL for a Submitted Website;
   b) a Shopping Cart accessible via said Search Webpage;
   c) a Recommendation Engine communicatively coupled to said Network, said Recommendation Engine comprising a computer-readable media with instructions executable by a processor, which when executed by said processor, causes said processor to perform the steps of:
      i) analyzing said Submitted Website;
      ii) determining an operating system on which said Submitted Website is running;
      iii) determining at least one software-implemented tool provided via said Submitted Website;
      iv) generating a Website Profile comprising said operating system and said at least one software-implemented tool;
      v) generating a list of at least one Hosting Application matching said operating system and said at least one software-implemented tool in said Website Profile; and
      vi) populating said Shopping Cart with said list of at least one Hosting Application;
   d) an Applications Database comprising a list of Hosting Applications that may be offered to a potential customer, said Applications Database communicatively coupled to said Network and searchable by said Recommendation Engine; and
   e) a Popular Website Profile Database comprising a plurality of Popular Website Profiles for popular websites, said Popular Website Profile Database communicatively coupled to said Network and searchable by said Recommendation Engine.

8. A method for recommending hosting applications, comprising the steps of:
   a) receiving, by at least one server computer communicatively coupled to a Network, a URL for a Submitted Website from a potential customer;
   b) determining, by at least one of said at least one server computer, an operating system on which said Submitted Website is running and at least one software-implemented tool provided via said Submitted Website; and
   c) offering, by at least one of said at least one server computer, at least one Hosting Application for sale to said potential customer, said at least one Hosting Application comprising said operating system and said at least one software implemented tool.

9. The method of claim 8, wherein said receiving step a) further comprises the step of providing a Search Webpage having a data field for entry of said URL by said potential customer.

10. The method of claim 9, further comprising the steps of, after step b) but before step c):
    i) generating, by at least one of said at least one server computer, a Website Profile identifying said operating system and said at least one software-implemented tool;
    ii) comparing, by at least one of said at least one server computer, said Website Profile against an Applications Database having a list of at least one Hosting Application that may be offered for sale to said potential customer; and
    iii) generating, by at least one of said at least one server computer, a list of said at least one Hosting Application matching said operating system and said at least one software-implemented tool.

11. The method of claim 10, wherein said generating a Website Profile step i) comprises selecting a Website Profile from a Popular Website Profile Database having a plurality of Popular Website Profiles for popular websites, said Website Profile listing an operating system or a software-implemented tool similar to those of said Submitted Website.

12. The method of claim 10, wherein said determining step b) further comprises the steps of:
    i) identifying a hosting provider hosting said Submitted Website;
    ii) requesting a list of said operating system and said at least one software-implemented tool from said hosting provider; and
    iii) receiving said list of said operating system and said at least one software-implemented tool from said hosting provider.

13. The method of claim 10, wherein said determining step b) comprises the step of analyzing said Submitted Website to determine said operating system and said at least one software-implemented tool.

14. The method of claim 13, wherein said analyzing step comprises analyzing a HTTP reply received from said Submitted Website.

15. The method of claim 9, wherein said offering step c) comprises populating a Shopping Cart on said Search Webpage with at least one Hosting Application.

16. The method of claim 8, wherein said at least one software-implemented tool comprises an e-mail application, an online file storage application, a forum application, a blog application, a shopping cart application, an SSL certificate, or a flash-based application.

17. A method for recommending hosting applications, comprising the steps of:
    a) providing, by at least one server computer communicatively coupled to a Network, a Search Webpage having a data field for entry of a URL for a Submitted Website by a potential customer;
    b) receiving, by at least one of said at least one server computer, said URL from said potential customer;
    c) attempting to determine, by at least one of said at least one server computer, an operating system on which said Submitted Website is running and at least one software-implemented tool provided via said Submitted Website by:
       i) identifying a hosting provider hosting said Submitted Website;
       ii) requesting a list of said operating system and said at least one software-implemented tool from said hosting provider; and
       iii) receiving said list from said hosting provider;

d) generating, by at least one of said at least one server computer, a Website Profile comprising a list of said operating system and said at least one software-implemented tool by:
   i) if said list is received: extracting said list of said operating system and said at least one software-implemented tool;
   ii) if said list is not received:
      A) analyzing said Submitted Website to determine said operating system and said at least one software-implemented tool; and
      B) generating said Website Profile by selecting a Website Profile from a Popular Website Profile Database having a plurality of Popular Website Profiles for popular websites, said Website Profile listing an operating system or a software-implemented tool similar to those of said Submitted Website;
e) comparing, by at least one of said at least one server computer, said Website Profile against an Applications Database having a list of at least one Hosting Application that may be offered for sale to said potential customer;
f) generating, by at least one of said at least one server computer, a list of said at least one Hosting Application matching each of said at least one feature; and
g) offering, by at least one of said at least one server computer, at least one Hosting Application for sale to said potential customer, said at least one Hosting Application implementing said operating system or said software-implemented tool.

* * * * *